L. W. HARRIS.
Harvester.
No. 16,730.
Patented March 3, 1857.
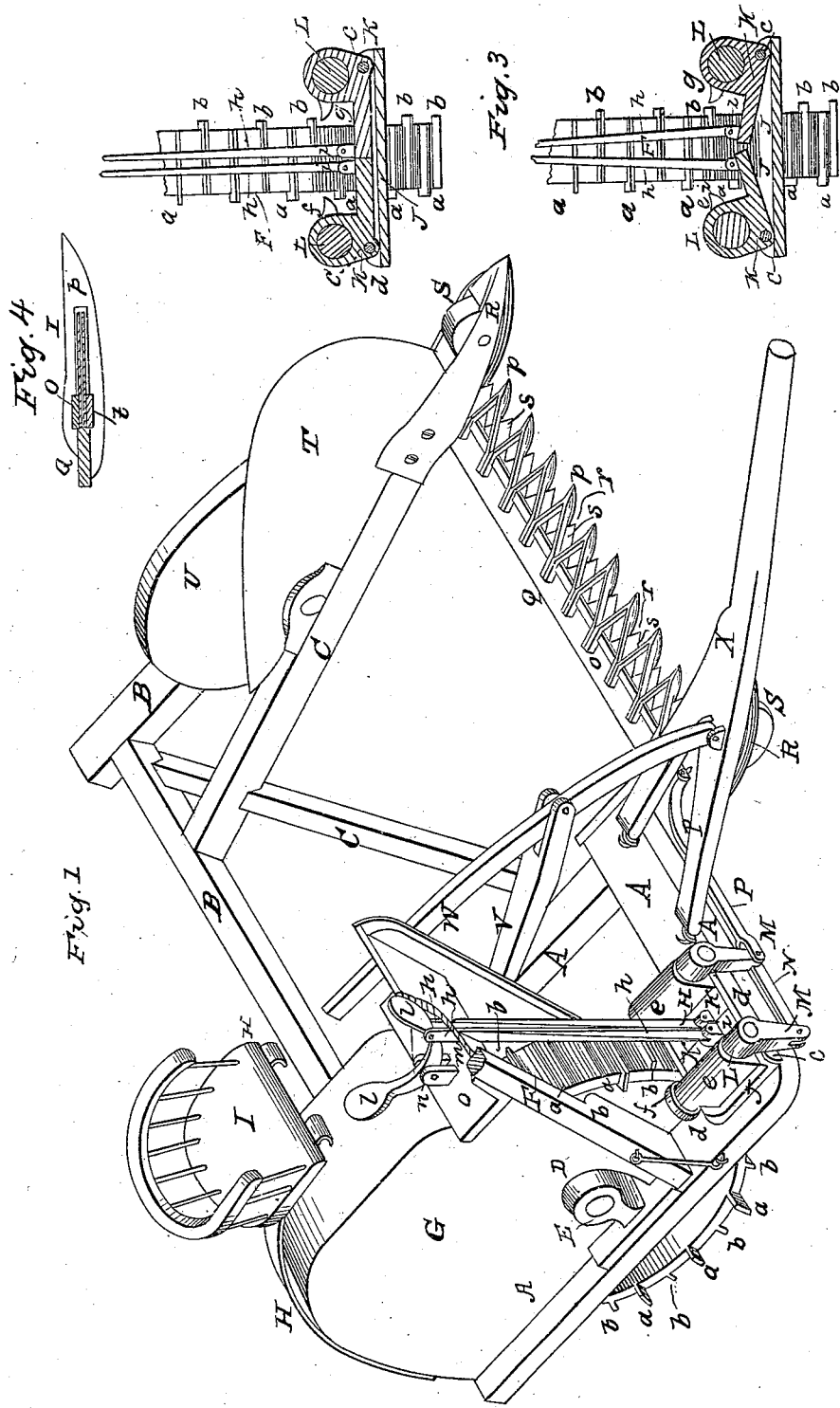

UNITED STATES PATENT OFFICE.

LEWIS W. HARRIS, OF WATERVILLE, NEW YORK.

IMPROVEMENT IN HARVESTERS.

Specification forming part of Letters Patent No. 16,730, dated March 3, 1857.

*To all whom it may concern:*

Be it known that I, LEWIS W. HARRIS, of Waterville, in the county of Oneida and State of New York, have invented certain new and useful Improvements in Harvesters; and I do hereby declare the following to be a full, clear, and exact description of the same, reference being had to the accompanying drawings, making a part of this specification, in which—

Figure 1 represents the machine in perspective. Figs. 2, 3, and 4 represent detached portions thereof, which will be hereinafter specially referred to in the description.

Similar letters of reference, where they occur in the several figures, denote like parts of the machine in all.

The nature of my invention relates more especially to the operating of the cutting apparatus, and the devices involving the several necessary functions which pertain to their successful operation, as will be pointed out.

To enable those skilled in the art to make and use my invention, I will proceed to describe the same with reference to the drawings.

A represents that part of the frame on which the gearing is arranged, and B the platform-frame, the latter being strengthened by the cross-braces C C, and both frames firmly united together.

In elevated boxes D on the main frame A, so as to bring said frame, with its several connected parts, low down to the ground, is supported the journals E of the axle of the main driving and supporting wheel F, said wheel being fast to and turning with said axle. The top and rear portion as well as the sides of the wheel F, are covered by a case, G, which should be made removable, so as to get at the wheel, should it be necessary to do so. On this case G is hung, by springs H, the conductor's seat I, which raises him high enough to see any opposing obstacle which would impede the progress of the machine, and to avoid it by raising up the machine, stopping the cutters, or the machine itself.

On the periphery of the main wheel F are cast or otherwise wrought a series of lags, *a a a b b b*, one set projecting slightly beyond the tread of the wheel to the left, and the other set to the right thereof, as shown in Figs. 1, 2, 3.

A bed-plate, J, is placed on top of the front part of the frame A, immediately in front of the main wheel F, and to the flanges *d d* of said bed-plate, at both of its ends, are hung, by pivoted points at *c*, a half-hinge, K, the hubs of which are hollow, and serve as bosses or sleeves for the shafts L L to pass through and turn in, there being oil-holes *e e* through the tops of said bosses to lubricate the shafts through.

To those ends of the two shafts L L next the driving-wheel F are connected respectively the toe-pieces *f g*, the former to be struck and slightly raised by the series of lags *a*, and the latter toe-piece to be similarly operated upon by the series of lags *b*, both sets of lags slightly projecting from the sides of the wheel for that purpose. This arrangement of parts gives to each of the shafts L L an alternate rocking motion in their bosses or bearings.

To the outer ends of the shafts L L are connected two cranks, M M, one on each shaft, which cranks are united together by a pivoted connecting-rod, N, which keeps the cranks parallel to each other, and causes the toe-pieces to keep each other in the line of the lags, so as to be operated by them.

Near the joint between the two half-hinge pieces K are lugs *i i*, to which the lower ends of the straps or rods *h h* are pivoted, the upper ends of said rods *h h* being similarly connected to one arm, *k*, of a treadle or foot-piece, pivoted at *n* to lugs *m m* on the foot-rest O, the other arm of said treadle being provided, as well as the one *k*, with a broad bearing, *l*, upon which the conductor from his seat may place his foot to throw the parts connected to the treadle into or out of gear, as circumstances may require. When the conductor places his foot on the front arm of the treadle *k* it throws down the pieces K K, as seen in Fig. 2, and brings the toe-pieces into gear with the lags, and thus the cutters are set in motion, as will be presently described. By placing his foot on the other arm of the treadle the parts will assume the positions respectively shown in Fig. 3, and out of gear. This is achieved by the eccentricity of the pivoted points *c c*, which carry the toe-pieces out of the path of lags, as seen in said Fig. 3.

The cranks M M being connected together, as heretofore described, there is attached to that one of them nearest the cutters one end of a pitman, P, the other end of said pitman being connected to the end of the vibrating cutter-bar *o* to give it its motion.

Q is the finger-beam, to which the open-top fingers p are connected, the ribs r of said fingers spreading, as shown in Fig. 1, so as to leave angular spaces between them.

I use two cutter-bars and two sets of cutters—viz., an upper one, o, upon which are the cutters s, which is rapidly vibrated through the fingers, and an under one, t, with similar cutting-blades, u, on it, as seen in the section of one of the fingers at Fig. 4, but which is stationary in the fingers, while the upper one moves in close contact with it to make the shearing-edge for it to cut against.

The lower cutter-bar and cutters are made precisely like the upper ones, the only difference being that one has motion and the other is stationary. Both are slipped into their places from the end of the finger-bar, the lower one being held by a pin passing through it, or by a stop of any kind, and both can be drawn out for sharpening, repairs, &c. The lower parts of the fingers serve as a support merely to the cutters, and do not make the edge against which the vibrating cutter works, the stationary cutter underneath forming the edge against which the moving cutters work.

R R are the shoes, placed one at each end of the platform, and have wheels S S arranged in them to keep them at proper distance from the ground, and thus avoid the friction which they would cause in dragging or sliding over the ground.

T is a curved board, united to the outside shoe, and is intended to turn the cut material farther onto the platform or away from the path of the outside supporting-wheel, U, and thus leave a clear track for it, as well as for the main driving-wheel, on the return-swath. The board T curves from the outside of the outer shoe to the line of the angular piece C of the frame, to which parts it is connected respectively at its front and rear ends.

V is a brace, the rear end of which is pivoted at a point near the center of motion of the driving-wheel F, and through its forked front end passes a lever, W, pivoted in the end of said brace. The lower end of this lever W is connected to the hinged tongue X, and its upper end extends up near to the conductor's seat, so that he may by his foot or hand raise up the cutters over any intervening obstacle, or set the cutters at any desired height from the ground.

Having thus fully described the nature of my invention, I would state that I am aware two rock-shafts with segmental wheels and pellets have been worked from a crown-wheel, and to one of which shafts the pitman was connected to vibrate the cutters. This I do not claim; but

What I do claim herein as new, and desire to secure by Letters Patent, is—

1. In combination with the alternately-projecting lags a b, the rocking shafts L L, with their toe-pieces, cranks, and connecting-rod N, for the purpose of operating the cutters, as set forth.

2. Hanging the shafts L L in the hinge-pieces K K, when said hinge-pieces are put within the control of the conductor, by means of the rods h h and treadle, or their equivalents, so that he may from his seat throw the cutters into and out of gear, as herein set forth and explained.

LEWIS W. HARRIS.

Witnesses:
   THOS. H. UPPERMAN,
   A. B. STOUGHTON.